United States Patent Office 3,105,077
Patented Sept. 24, 1963

3,105,077
REACTION PRODUCTS OF URACIL DERIVATIVES AND FORMALDEHYDE
Erich Müller and Dietrich Jerchel, Biberach (Riss), Germany, assignors to Dr. Karl Thomae G.m.b.H., Biberach (Riss), Germany, a corporation of Germany
No Drawing. Filed Mar. 8, 1961, Ser. No. 94,130
Claims priority, application Germany Mar. 11, 1960
7 Claims. (Cl. 260—256.4)

This invention relates to condensation products of uracil derivatives and formaldehyde wherein the formaldehyde is attached through a labile, reversible chemical linkage, the exact nature of which is not known; however, the condensation linkage is such that the formaldehyde is readily split off under physiological conditions in the human body.

The uracil derivatives from which the condensation products according to the present invention are derived have a formula selected from the group consisting of

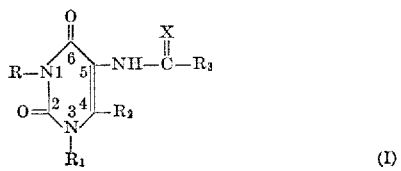

and

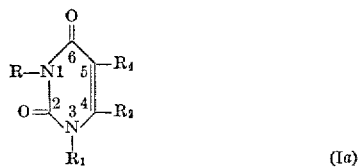

wherein:

R and $R_1$, which may be identical to or different from each other, are selected from the group consisting of hydrogen and lower alkyl, especially methyl, $R_2$ is selected from the group consisting of lower alkyl, especially methyl, and primary amino, $R_3$ is selected from the group consisting of primary amino, lower alkylamino, phenylamino, aminophenyl, phenyl, ω-carboxy-lower alkyl, ω-carboxy-lower alkenyl and lower alkenylamino, $R_4$ is selected from the group consisting of hydrogen, primary amino and aminophenyl-sulfonamido, and X is selected from the group consisting of oxygen, sulfur and imino, but preferably oxygen and sulfur.

A further criterion is that uracil derivatives I and Ia must have at least one free imino group in the molecule, that is, at least one free imino group (—NH—) either in the heterocyclic nucleus or in the side chains in the 4- and 5- positions or in both.

The condensation products according to the present invention are conveniently prepared by suspending the uracil derivative of the Formula I or Ia in a formaldehyde solution, preferably an aqueous formaldehyde solution, such as 40% Formalin, and allowing the resulting reaction mixture to stand for a few hours or even a few days at room temperature or at elevated temperatures, preferably at temperatures between room temperature and 60° C., inclusive. The condensation reaction periods and temperatures depend upon the nature of substituents R, $R_1$, $R_2$, $R_3$ and $R_4$, but a prolongation of the reaction period affects neither the composition nor the degree of effectiveness of the products obtained thereby. The pH of the reaction mixture must be at least 7 and the condensation reaction is substantially accelerated when the pH is 8–11, which is conveniently accomplished by adding an inorganic base, such as sodium carbonate, potassium hydroxide and the like, to the reaction mixture.

The molar ratio of formaldehyde to uracil derivative should be such that the reaction mixture contains at least one molar equivalent of formaldehyde, based on the molar quantity of the uracil derivative, for each reactive imino group in the molecule of the uracil derivative. For example, if 0.1 mol of the uracil derivative is to be condensed with formaldehyde and the uracil derivative contains four reactive imino groups, the reaction mixture should contain 0.1 mol of uracil derivative and at least 0.4 (4×0.1) mols of formaldehyde or a substance yielding 0.4 mols of formaldehyde under the condensation conditions indicated above. If this minimum molar relationship between formaldehyde and uracil derivative is met, the particular uracil derivative will always form a condensation product comprising the same amount of reversibly bonded formaldehyde, usually one mol equivalent of formaldehyde per reactive imino group, no matter whether an excess of formaldehyde is offered for condensation or merely the minimum molar amount. In other words, if 0.1 mol of the uracil derivative with four reactive imino groups is condensed with 0.4 mol formaldehyde or more, the condensation product will always contain about 0.1 mol reversibly bonded formaldehyde for each reactive imino group, or a total of about 0.4 mol reversibly bonded, labile formaldehyde.

The isolation of the condensation products according to the invention from the condensation reaction mixture is relatively simple and the applicable procedure depends primarily upon the solubility of the particular condensation product. If the condensation product is readily water-soluble, such as the condensation product of formaldehyde and 1,3-dimethyl-4-amino-5-ureido-uracil, the reaction mixture turns into a homogeneous liquid during the condensation reaction and the condensation product is most conveniently isolated by precipitation with the aid of a water-miscible organic solvent wherein the condensation product, however, is insoluble, that is by adding to the reaction liquid an organic solvent, such as alcohol or acetone, until all of the condensation product has precipitated out. The precipitate may then be isolated by simple filtration.

In the event that the condensation product is relatively soluble in these solvents, as is the condensation product of formaldehyde and 3-methyl-4,5-diamino-uracil, the water and excess formaldehyde, if any, are first advantageously entirely or partly removed by vacuum distillation.

Finally, if the condensation product is very difficulty soluble in water, as in the condensation product of formaldehyde and 3-methyl-4-amino-uracil, a thick crystalline slurry is formed during the reaction which needs to be merely vacuum filtered and thereafter washed with water to isolate the raw condensation product.

The raw product is then freed from water and uncondensed formaldehyde adhering thereto by heating to moderately elevated temperatures in vacuo. Thereafter, the condensation product has a constant content of chemically reversibly bonded formaldehyde, which may readily be analytically determined by reaction with an exactly neutralized sodium sulfite solution and measurement of the amount of sodium hydroxide liberated thereby (see Houben-Weyl, 4th ed., vol. II, page 464).

The uracil derivatives used as starting materials in the preparation of the condensation products according to the invention are known compounds. Some of them are intermediates in the synthesis of purines and other therapeutics and are, therefore, inexpensive, while others may be obtained by alkylation or acylation of such intermediates according to known methods.

The following examples are illustrations of the preparation of the condensation products according to the present invention and will enable others skilled in the art to understand the present invention more completely. It is understood, however, that our invention is not limited to these particular illustrative examples.

EXAMPLE I 25.0 gm. (0.178 mol) of 3-methyl-4-amino-uracil of the formula

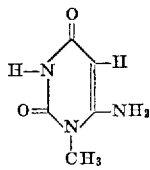

were admixed with 26.6 gm. of 40% Formalin, which is equivalent to 10.6 gm. (2×0.178 mol) of formaldehyde, and 0.5 gm. of pulverized potassium carbonate were stirred into the mixture. The temperature of the reaction mixture distinctly rose. After allowing the reaction mixture to stand for three days at room temperature, it was vacuum filtered, and the filter cake was washed with water and then dried in a desiccator over calcium chloride. A yellowish powder was obtained which had a melting point of 340° C. (decomposition). The powder was insoluble in water, dilute sodium hydroxide and hydrochloric acid.

Formaldehyde content by titration with neutralized sodium sulfite solution: 18.06% by weight (Calculated for 1 mol per mol of uracil: 17.5%).

EXAMPLE II 25.0 gm. (0.147 mol) of 1,3-dimethyl-4,5-diamino-uracil of the formula

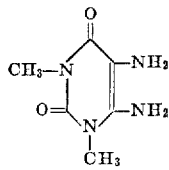

were thoroughly admixed with 44.1 gm. of 40% Formalin, which is equivalent to 17.6 gm. (4×0.147 mol) of formaldehyde. Accompanied by evolution of heat, a clear yellow solution was formed. This solution was evaporated to dryness in vacuo over calcium chloride at room temperature. The viscous yellow residue formed thereby was taken up in cold ethanol. The ethanol mixture was heated and vigorously triturated until crystallization occurred. The yellow crystalline substance was separated by vacuum filtration, washed with ethanol and dried. It had a melting point of 240–246° C. Titrated formaldehyde content: 12.1% by weight (Calculated for 1 mol per mol of uracil: 15.0%).

EXAMPLE III 25.0 gm. (0.160 mol) of 3-methyl-4,5-diamino-uracil of the formula

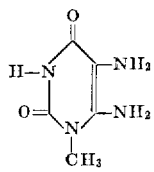

were thoroughly admixed with 48 gm. of 40% Formalin, which is equivalent to 19.2 gm. (4×0.160 mol) of formaldehyde. Accompanied by a distinct evolution of heat, a clear yellow solution was formed. This solution was evaporated to dryness at room temperature in a vacuum desiccator over phosphorus pentoxide. The hard residue was ground into a dry yellow powder, which had a melting point of 220° C. (decomposition); it began to sinter at 170° C.

Titrated formaldehyde content: 25.1% by weight (Calculated for 2 mols per mol of uracil: 27.8%).

EXAMPLE IV 12.6 gm. (0.1 mol) of 4-methyl-uracil of the formula

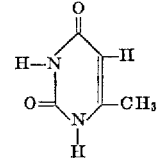

were thoroughly admixed with 15.8 gm. of 38% Formalin, which is equivalent to 6.0 gm. (2×0.1 mol) of formaldehyde. The resulting mixture was placed into a closed vessel, and this vessel was placed for 25 hours into a drying chamber at 50° C. Thereafter, 15 cc. of water were added to the slurry-like suspension, the aqueous mixture was vigorously stirred, vacuum filtered and the white crystalline filter cake was dried in a desiccator.

Formaldehyde content by titration: 23.8%, by weight which corresponds to 1.3 mol HCHO per mol of uracil.

Upon further drying the crystalline substance in a drying chamber at 50° C., the formaldehyde content continuously decreased and after 9 hours reached a constant value of 17.5%, which corresponds to 0.89 mol HCHO.

EXAMPLE V 50.0 gm. (0.235 mol) of 1,3-dimethyl-4-amino-5-ureido-uracil of the formula

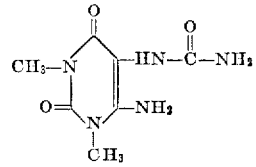

were admixed with 0.5 gm. of pulverized potassium carbonate and with 76.0 gm. of 38% Formalin, which is equivalent to 28.9 gm. (4.1×0.235 mol) of formaldehyde. The resulting mixture was heated at 50° C. for 7 hours. During this time a clear, oily solution gradually formed. This solution was heated on a water bath at 50° C. and under a vacuum of 12 mm. Hg. to distill off about 80–90% of the water introduced with the Formalin. The syrupy residue was taken up in 100 cc. of methanol, the methanolic mixture was boiled for about 5 minutes and then diluted to a volume of 1.5 liters with acetone. Upon standing for about one hour, flaky crystals separated out which were separated by vacuum filtration and then dried in a desiccator. The dry crystals were readily water-soluble.

Titrated formaldehyde content: 19.5%, by weight which corresponds to 1.75 mol HCHO per mol of uracil. The dry crystals were heated in a drying chamber at 50° C., whereby the formaldehyde content gradually decreased until after 20 hours it reached a constant value of 17.5%, by weight which corresponds to 1.5 mol HCHO per mol of uracil.

EXAMPLE VI 39.8 gm. (0.2 mol) of 3-methyl-4-amino-5-uredio-uracil of the formula

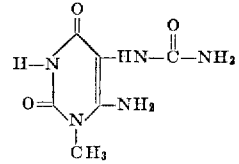

were admixed with 0.7 gm. of pulverized potassium carbonate and the mixture was stirred into 90.0 gm. of 40%

Formalin, which is equivalent to 36.0 gm. (6×0.2 mol) of formaldehyde. The resulting suspension was heated for 19 hours at 60° C., whereby a clear, oily solution was formed. Thereafter, the reaction solution was allowed to cool to room temperature and was then poured slowly over a period of 20 minutes into 1100 cc. of ethanol at 0° C., while stirring. Subsequently, the ethanolic solution was allowed to stand at 0° C. for about 20 minutes. During this time a white, crystalline precipitate formed which was separated by vacuum filtration, washed with cold ethanol and dried for two hours in a drying chamber at 60° C. The dry crystalline product was readily water-soluble.

Titrated formaldehyde content: 22.0% by weight, which corresponds to 1.89 mols HCHO per mole of uracil.

The product was then further dried at 60° C., whereby the formaldehyde content gradually decreased until, after 18 hours, it reached a constant value of 17.5% by weight, which corresponds to 1.44 mols of HCHO per mol of uracil.

EXAMPLE VII 4.0 gm. (0.0166 mol) of 1,3-dimethyl-4-amino-5-(N'-ethylureido)-uracil of the formula

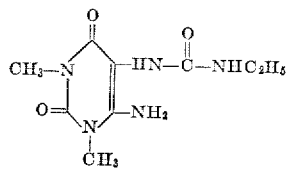

were admixed with 0.1 gm. of sodium carbonate and the mixture was stirred into 5.24 gm. of 38% Formalin, which is equivalent to 1.99 gm. (4×0.0166 mol) of formaldehyde. The resulting reaction mixture was then heated for 6 hours at 60° C., whereby a clear solution was formed. This solution was evaporated to dryness at room temperature and under a vacuum of 12 mm. Hg. The evaporation residue was then taken up in 10 cc. of methanol and the resulting solution was diluted with 100 cc. of ether. A partly crystalline, partly pasty precipitate was formed which was separated and again reprecipitated from a mixture of methanol and ether in the manner described above. The crystalline reaction product was then separated by vacuum filtration and dried in a desiccator. 3 gm. of a crystalline substance were obtained which had a melting point of 105–110° C.

Titrated formaldehyde content: 17.3% by weight, which corresponds to 1.68 mols HCHO per mol of uracil.

EXAMPLE VIII 3.25 gm. (0.01 mol) of 1,3-dimethyl-4-amino-5-sulfanilamido-uracil of the formula

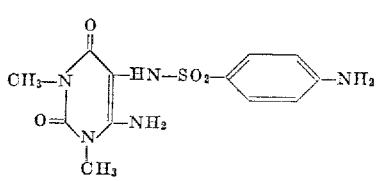

were admixed with 3.95 gm. of 38% Formalin, which is equivalent to 1.50 gm. (5×0.01 mol) of formaldehyde, and the resulting mixture was heated for 16 hours at 50° C. At the end of this time the entire reaction mixture had transformed into a solid mass. This mass was removed in chunks from the reaction vessel, the chunks were ground into a fine granular mass which was washed with water and dried in a desiccator. Yield: 5.5 gm. Melting point: 215–217° C. (decomposition).

EXAMPLE IX 3.0 gm. (0.0104 mol) of 1,3-dimethyl-4-amino-5-p-aminobenzamido-uracil of the formula

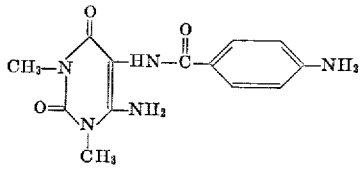

were admixed with 0.1 gm. of potassium carbonate and 4.1 gm. of 38% Formalin, which is equivalent to 1.56 gm. (5×0.0104 mol) of formaldehyde, and the resulting mixture was heated for 24 hours at 50° C., whereby a clear solution was formed. This solution was allowed to cool and was then diluted with ethanol to a total volume of 100 cc. The solution was allowed to stand for about one hour, during which time yellow flakes separated out. The flaky precipitate was separated by vacuum filtration, washed with ethanol and dried in a desiccator over calcium chloride. The product was difficultly soluble in water, dilute sodium hydroxide or hydrochloric acid.

Titrated formaldehyde content: 19.7%, by weight which corresponds to 2.35 mol HCHO per mol of uracil.

EXAMPLE X 5.0 gm. (0.01865 mol) of N-(1,3-dimethyl-4-amino-uracil-5-yl)-maleic acid monoamide of the formula

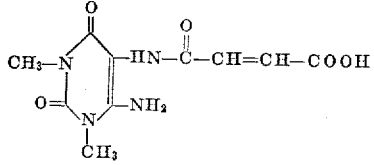

(prepared from 1,3-dimethyl-4,5-diamino-uracil and maleic acid anhydride) were suspended in 25.2 gm. of 40% Formalin, which is equivalent to 10.1 gm. (18×0.01865 mol) of formaldehyde, and the resulting suspension was adjusted to a pH of 8–9 with 2 N NaOH. A clear solution was formed, which was heated for 4 hours at 50° C. Thereafter, the water and the excess formaldehyde were distilled off at 50° C. and under a vacuum of 5 mm. Hg until a very viscous residue remained. This residue was dissolved in 50 cc. of methanol and the resulting solution was diluted with acetone to a total volume of 200 cc. A crystalline precipitate formed, which was separated by vacuum filtration and dried in a desiccator over calcium chloride. The dry product had a melting point of 105° C. (decomposition).

Titrated formaldehyde content: 22.6%, by weight which corresponds to 2.5 mol HCHO per mol of uracil.

EXAMPLE XI 5.0 gm. (0.0186 mol) of 1,3-dimethyl-4-amino-5-(N'-allyl-thioureido)-uracil of the formula

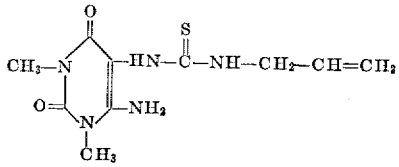

(prepared from 1,3-dimethyl-4,5-diamino-uracil and allyl isothiocyanate) were admixed with 2.23 gm. of 40% Formalin, which is equivalent to 5.6 gm. (4×0.0186 mol) of formaldehyde, and the resulting mixture was heated in a closed pressure vessel for 24 hours at 60° C. Thereafter, the reaction mixture was allowed to cool and the crystalline reaction product which had separated out was separated by vacuum filtration and dried over calcium chloride in a desiccator.

Titrated formaldehyde content: 21.4%, by weight which corresponds to 2.46 mol HCHO per mol of uracil.

EXAMPLE XII 5.0 gm. (0.0172 mol) of 3-methyl-4-amino-5-(N'-phenyl-thioureido)-uracil of the formula

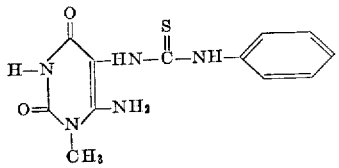

(prepared from 3-methyl-4,5-diamino-uracil and phenyl isothiocyanate) were reacted with 6.45 gm. of 40% Formalin, which is equivalent to 2.58 gm. (5×0.0172 mol) of formaldehyde, as described in Example XI and the reaction mixture was worked up in the manner set forth in the preceding example.

Titrated formaldehyde content: 8.9%, by weight which corresponds to 2.5 mol HCHO per mol of uracil.

The compounds according to the present invention, i.e. the condensation products of uracil derivatives of the Formula I or Ia with formaldehyde, exhibit anti-microbial, anti-viral and anti-hidrotic properties and have substantial and unforeseeable advantages over known pharmacologically active formaldehyde condensation products. Their toxicity is very low; for instance the $LD_{50}$ of the condensation product of Example IV in mice is 2.2 gm./kg. per os, that of the condensation product of Example V is 9.58 gm./kg. per os, and that of the condensation product of Example VI is 7.7 gm.kg. per os. In addition to improved anti-microbial and especially anti-hidrotic activities, anti-viral properties and very low toxicity, they also exhibit a hardening and drying effects upon softened and swollen tissue which often accompanies inflammations.

The condensation products are odorless, solid substances which are stable over a wide range of temperatures. A further advantage resides in that, as illustrated by the examples, it is possible to prepare products which, depending upon the particular uracil derivative used as the condensation component, are readily water-soluble as such or in the form of their alkali metal salts, such as N-(1,3-dimethyl-4-amino-uracil-5-yl) maleic acid mono-amide, or also products which are readily soluble in alcohols, glycols or polyglycols, or also products which are substantially insoluble in all of the customary solvents. However, regardless of their particular solubility properties, all of the compounds according to the present invention are pharmacologically and therapeutically highly effective in the sense outlined above. By virtue of the versatility of their particular characteristics, the compounds according to the present invention may be incorporated into a variety of compositions, such as tablets, lozenges, solutions, tinctures, aerosol, sprays, ointments, emulsions, powders and the like.

The therapeutic and pharmacological activity of the condensation products according to the invention is predicated upon the ease with which the reversibly bonded formaldehyde is split off under physiological conditions. The uracil derivatives remaining after the formaldehyde is split off are components of nucleic acids, purines and vitamins or are compounds closely related to such components and are, therefore, physiologically fully compatible.

In practical therapy the condensation products according to the present invention are useful as disinfectants and antiseptics in the treatment and prophylaxis of inflammations of the tissue of the oral and pharyngeal cavities as well as of the bile and urinary ducts. However, either alone or in combination with other anti-microbial agents or assistants, such as phenols, quaternary ammonium compounds, anionic, cationic or nonionic wetting agents and the like, they may also be employed for the preparation of preservatives and disinfectants or of disinfectant cleansing agents for medicinal or non-medicinal application. The following examples illustrate various compositions comprising the condensation products according to the present invention as active ingredients, which may be employed for the therapeutic purposes set forth above. The parts are parts by weight unless otherwise specified.

EXAMPLE XIII

*Lozenges Containing 10 mgm. of Available Formaldehyde*

The lozenges are compounded from the following ingredients:

| | Parts |
|---|---|
| Formaldehyde-uracil compound condensation product of Example VI | 45.5 |
| Powdered sugar | 1005.0 |
| Suppository base (Witepsol®)[1] | 40.0 |
| Magnesium stearate | 9.5 |
| Total | 1100.0 |

[1] Mixture of mono-, di- and triglycerides of the saturated fatty acids $C_{11}H_{23}COOH$ to $C_{17}H_{35}COOH$.

*Compounding procedure.*—The powdered sugar and the formaldehyde condensation product are thoroughly blended with each other and the resulting mixture is uniformly moistened first with 80 parts of distilled water and then with a solution of the suppository base in 80 parts of ethanol. The moist composition obtained thereby is passed through a 1.5 mm.-mesh screen and is then dried at 40° C. The resulting dry granulate is pressed into lozenges weighing 1.1 gm. each. Each lozenge contains 45.5 mgm. of the active formaldehyde-uracil compound condensation product. When allowed to dissolve in the mouth, each lozenge releases 10 mgm. of formaldehyde.

EXAMPLE XIV

*Solution With 1% Available Formaldehyde*

100 ml. of solution are compounded from the following ingredients:

| | | |
|---|---|---|
| Formaldehyde-uracil compound condensation product of Example II | gm | 5.715 |
| Ethanol | gm | 15.0 |
| Essential oil | gm | 0.1 |
| Distilled water, q.s. ad | ml | 100.0 |

*Compounding procedure.*—The formaldehyde condensation product is dissolved in 70 ml. of water and a solution of the essential oil in the ethanol is added thereto. The resulting solution is there diluted with distilled water to a total volume of 100 ml. and is filtered through a suitable filter. The resulting antimicrobial and anti-viral solution is adapted for use as nose drops and the like.

EXAMPLE XV

*Tincture Containing 5% Available Formaldehyde*

100 ml. of tincture are compounded from the following ingredients:

| | | |
|---|---|---|
| Formaldehyde-uracil compound condensation product of Example VI | gm | 22.725 |
| Ethanol | gm | 30.0 |
| Glycerin | gm | 15.0 |
| Essential oil | gm | 0.1 |
| Distilled water, q.s. ad | ml | 100.0 |

*Compounding procedure.*—The formaldehyde condensation product is dissolved in about 30 cc. of distilled water, and the resulting solution is gradually admixed, accompanied by vigorous stirring, with a mixture of the ethanol, the glycerin and the essential oil. The resulting solution is then diluted with distilled water to a total volume of 100 ml. and is filtered through a suitable filter. The resulting anti-bacterial and anti-viral tincture is adapted for surface application to inflamed tissue.

EXAMPLE XVI

*Ointment With 2% Available Formaldehyde*

The ointment is compounded from the following ingredients:

| | Parts |
|---|---|
| Formaldehyde - uracil compound condensation product of Example X | 8.85 |
| Wool grease alcohol | 8.0 |
| White vaseline | 62.0 |
| Distilled water | 21.15 |
| Total | 100.0 |

*Compounding procedure.*—The vaseline and the wool grease alcohol are admixed and the mixture is heated to 60° C., forming a molten mixture of the components. The distilled water is then heated to 60° C. and is stirred into the melt. The resulting emulsion is then cooled to 45° C. and the formaldehyde condensation product in finely divided form is stirred into the emulsion. The resulting ointment composition is finally blended in a colloid mill.

EXAMPLE XVII

*Dusting Powder With 3% Available Formaldehyde*

The dusting powder is compounded from the following ingredients:

| | Parts |
|---|---|
| Formaldehyde - uracil compound condensation product of Example XI | 14.02 |
| Talcum | 75.88 |
| Silicic acid, finely divided | 10.00 |
| Essential oil | 0.10 |
| Total | 100.0 |

*Compounding procedure.*—The formaldehyde condensation product is thoroughly blended by grinding with a portion of the talcum; the essential oil is also admixed by grinding with another portion of the talcum. Both of these mixtures are then combined with the remainder of the talcum and with the silicic acid, and the resulting powder composition is blended and milled in a suitable mill.

EXAMPLE XVIII

*Emulsion With 2% Available Formaldehyde*

The emulsion is compounded from the following ingredients.

| | Parts |
|---|---|
| Formaldehyde - uracil compound condensation product of Example III | 7.96 |
| Emulgade F® (mixture of higher saturated fatty alcohols with fatty alcohol sulfates and non-ionic emulsifiers) | 0.2 |
| Paraffin oil | 13.5 |
| Cremophor A,® solid (polyethyleneglycolstearyl-ether) | 3.0 |
| Essential oil | 0.5 |
| Distilled water | 74.84 |
| Total | 100.0 |

*Compounding procedure.*—The emulsifier and the Cremophor A are melted, admixed with the paraffin oil and heated to 70° C. The resulting mixture is stirred into a solution of the formaldehyde condensation product in the indicated amount of water. After allowing the mixture to cool to room temperature, the essential oil is stirred in and the entire mixture is thoroughly blended.

EXAMPLE XIX

*Aerosol Spray With 5% Available Formaldehyde*

The aerosol spray composition is compounded from the following ingredients:

| | Parts |
|---|---|
| Formaldehyde - uracil compound condensation product of Example V | 2.86 |
| Isopropyl myristate | 1.5 |
| Essential oil | 0.1 |
| Ethanol | 30.0 |
| Isopropanol | 35.54 |
| Difluoro-dichloro-methane | 30.0 |
| Total | 100.0 |

*Compounding procedure.*—The formaldehyde condensation product, the isopropyl myristate and the essential oil are dissolved in a mixture of the ethanol and the isopropanol, accompanied by stirring. The resulting solution is filled into suitable aerosol spray containers together with the difluoro-dichloro-methane propellant, either under refrigeration or pressure. The resulting anti-microbial and anti-viral spray is adapted for tropical spray application to inflamed tissue.

While we have illustrated our invention with the aid of certain specific embodiments, it will be readily apparent to those skilled in the art that the invention is not limited to those specific embodiments and that various changes and modifications may be made without departing from the spirit of the invention or the scope of the appended claims.

We claim:

1. The product obtained by reacting a uracil compound having a formula selected from the group consisting of

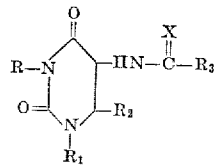

and

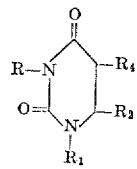

wherein:

R and $R_1$ are selected from the group consisting of hydrogen and lower alkyl, $R_2$ is selected from the group consisting of lower alkyl and primary amino, $R_3$ is selected from the group consisting of primary amino, lower alkylamino, lower alkenylamino, phenylamino, aminophenyl, phenyl, and ω-carboxy-lower alkyl, $R_4$ is selected from the group consisting of hydrogen, primary amino and aminophenyl-sulfonamido, and X is selected from the group consisting of oxygen and sulfur, said uracil compound comprising at least one —NH— group in the molecule, with formaldehyde under neutral to alkaline conditions and at a temperature between room temperature and about 60° C., the ratio of formaldehyde to uracil compound in the reaction mixture being at least one mol of formaldehyde for each —NH— group in 1 mol—equivalent of uracil compound.

2. The product obtained by reacting 3-methyl-4-amino-5-ureido-uracil with formaldehyde under alkaline conditions and at a temperature between room temperature and about 60° C., the ratio of formaldehyde to uracil compound in the reaction mixture being at least two mols of formaldehyde for each mol of 3-methyl-4-amino-5-ureido-uracil.

3. The product obtained by reacting 4-methyl-uracil with formaldehyde under neutral conditions at a temperature between room temperature and about 60° C., the ratio of formaldehyde to uracil compound in the reaction mixture being at least 2 mols of formaldehyde per mol of 4-methyl-uracil.

4. The product obtained by reacting 1,3-dimethyl-4-amino-5-ureido-uracil with formaldehyde under alkaline conditions at a temperature between room temperature and about 60° C., the ratio of formaldehyde to uracil compound in the reaction mixture being at least 3 mols of formaldehyde per mol of 1,3-dimethyl-4-amino-5-ureido-uracil.

5. The product obtained by reacting N-(1,3-dimethyl-4-amino-uracil-5-yl)-maleic acid monoamide with formaldehyde under alkaline conditions at a temperature between room temperature and about 60° C., the ratio of formaldehyde to uracil compound in the reaction mixture being at least 2 mols of formaldehyde per mol of N-(1,3-dimethyl-4-amino-uracil-5-yl)-maleic acid monoamide.

6. The product obtained by reacting 3-methyl-4,5-diamino-uracil with formaldehyde under neutral conditions at a temperature between room temperature and about 60° C., the ratio of formaldehyde to uracil compound in the reaction mixture being at least 3 mols of formaldehyde per mol of 3-methyl-4,5-diamino-uracil.

7. The product obtained by reacting 1,3-dimethyl-4-amino-5-(N'-allyl-thioureido)-uracil with formaldehyde under neutral conditions at a temperature between room temperature and about 60° C., the ratio of formaldehyde to uracil compound in the reaction mixture being at least 3 mols of formaldehyde per mol of 1,3-dimethyl-4-amino-5-(N'-allyl-thioureido)-uracil.

References Cited in the file of this patent

UNITED STATES PATENTS

| | | |
|---|---|---|
| 2,655,501 | Weinkauf | Oct. 13, 1953 |
| 2,781,344 | Compte | Feb. 12, 1957 |
| 2,785,163 | Swidinsky et al. | Mar. 12, 1957 |

OTHER REFERENCES

Monti et al.: Gazz. Chim. Ital., volume 78, pages 638–646 (1948).

UNITED STATES PATENT OFFICE
CERTIFICATE OF CORRECTION

Patent No. 3,105,077 September 24, 1963

Erich Müller et al.

It is hereby certified that error appears in the above numbered patent requiring correction and that the said Letters Patent should read as corrected below.

Column 7, line 21, for "2.5" read -- 0.95 --; line 35, for "effects" read -- effect --.

Signed and sealed this 7th day of April 1964.

(SEAL)
Attest:

ERNEST W. SWIDER
Attesting Officer

EDWARD J. BRENNER

Commissioner of Patents